United States Patent [19]

Brawerman, deceased et al.

[11] Patent Number: 5,022,145
[45] Date of Patent: Jun. 11, 1991

[54] METHOD OF CONSTRUCTING A GAS TURBINE

[76] Inventors: Michael Brawerman, deceased, late of Ramat Aviv, Tel Aviv, by Emilia Orian, executrix; Itamar Orian, both of 13, Rav Ashi Street, Tel Aviv, all of Israel

[21] Appl. No.: 387,275

[22] Filed: Jul. 31, 1989

Related U.S. Application Data

[63] Continuation-in-part of Ser. No. 122,514, Nov. 17, 1987, abandoned, which is a continuation of Ser. No. 853,878, Apr. 21, 1986, abandoned.

[30] Foreign Application Priority Data

Apr. 19, 1985 [IL] Israel .......................................... 74973

[51] Int. Cl.⁵ .............................................. B23P 15/00
[52] U.S. Cl. ..................................... 29/88.8; 29/401.1; 29/469
[58] Field of Search .............. 29/888, 469, 428, 401.1; 415/219 R; 60/39.31, 39.32, 39.161

[56] References Cited

U.S. PATENT DOCUMENTS

| | | | |
|---|---|---|---|
| 3,842,596 | 10/1974 | Smith et al. | 60/39.32 |
| 4,030,288 | 6/1977 | Davis et al. | 60/39.31 |
| 4,281,510 | 8/1981 | Börjesgard et al. | 60/39.32 |
| 4,418,528 | 12/1983 | Pellow | 60/39.31 |
| 4,506,509 | 3/1985 | Kronagard deceased et al. | 60/39.31 |
| 4,744,214 | 5/1988 | Monsarrat et al. | 60/39.161 |

OTHER PUBLICATIONS

"Dresser Packages Gas Turbine in Six Modules" *Sawyers Gas Turbine Catalog* for 1970, p. 179.
"High Availability" *Gas Turbine International* Mar.-Apr. 1972, p. 3.
"Small Modular Engines" *Gas Turbine World* Mar. 1974, p. 27.

*Primary Examiner*—P. W. Echols
*Assistant Examiner*—I. Cuda
*Attorney, Agent, or Firm*—Fleit, Jacobson, Cohn, Price, Holman & Stern

[57] ABSTRACT

Low cost turbines are provided by providing a design adapted for production of versatile and flexible configuration of gas turbines at the ultimate customer's worksite from mass produced standard components; so called modules, which are obtained from the orginal manufacturer of the modules, and connected by universal conduits and connections.

6 Claims, 11 Drawing Sheets

LIST OF BASIC CONNECTORS AND THEIR SCHEMATIC DESCRIPTION
.................................................

| DESCRIPTION OF CONNECTOR | SCHEMATIC DESCRIPTION |
|---|---|
| 1 PNEUMATIC CONNECTOR<br>　PIPE TUBE FLEXIBLE HOSE | ____A____A____A____ |
| 2 HYDRAULIC CONNECTOR<br>　PIPE TUBE FLEXIBLE HOSE | ____H____H____H____ |
| 3 FUEL CONNECTOR<br>　PIPE TUBE FLEXIBLE HOSE | ____F____F____F____ |
| 4 ELECTRICAL POWER CONNECTOR<br>　WIRE CABLE | ____W____W____W____ |
| 5 COMMAND CONNECTOR<br>　ELECTRICAL PNEUMATICAL HYDRAULIC<br>　SIGNALS AND COMMAND | ____C____C____C____ |
| 6 OIL AND LUBRICANT CONNECTOR<br>　PIPE TUBE FLEXIBLE HOSE | ____L____L____L____ |
| 7 MECHANICAL CONNECTOR<br>　SHAFTS FLEXIBLE SHAFTS<br>　BELTS GEARS | ____E____E____E____ |

METHOD OF CONSTRUCTING A GAS TURBINE

This application is a continuation-in-part of U.S. Pat. application Ser. No. 07/122,514, filed Nov. 17, 1987, now abandoned which is a continuation of U.S. Pat. application Ser. No. 06/853,878, filed Apr. 21, 1986, now abandoned.

FIELD OF THE INVENTION

The present invention relates to gas turbines and especially to small gas turbines for generating hot gasses, compressed air, power, or any combination of them for either industrial, agricultural, civil engineering or emergency applications.

BACKGROUND OF THE INVENTION

Gas turbine machines have many forms and applications. The two most popular and known are turbo-jet engines and the type of turbine engines that supply mechanical power. These turbine engines are built today mainly for aeronautical and military applications, and therefore designed to very high standards and are produced only in relatively small series.

As a result of this situation, turbine engines are so highly priced that they are prohibitive for most civilian and industrial markets. Accordingly, at present there is no extensive usage of turbines in civilian installations, apart from a few back up and emergency turbine generators in power stations. In the below 100 HP size, for which the military has almost no use, there is an acute lack of gas turbines and it is in this range of size that civilian applications would be desirable.

Under these conditions of construction and of use of gas turbines, the building and use of small units has been excluded a priori for economical reasons.

Technical problems cause a decrease of the mechanical efficiency of gas turbine engines in relation to their size. Generally, it may be said that small turbine engines of the same type are less efficient than big ones. But besides their use as prime movers, in which capacity they are rather inefficient, gas turbine machines can fulfil a range of other duties. As hot gas generators, for example, their efficiency is very high, whilst other roles include blowers, compressors, combined heaters and compressors, as well as many other applications. It is in these duties, because of compactness, high efficiency, reliability, and long service life combined with a multi-fuel capacity that gas turbines can provide an attractive alternative solution to existing installations.

For all these reasons, it would be highly desirable to have small gas turbine units—mainly for the production of hot gases for industrial—purposes which should be produceable in reasonably large series at an ultimate customer's worksite, at reasonable cost, with proper spare parts availability.

SUMMARY OF THE INVENTION

It is therefore an object of this invention to provide means for producing low cost gas turbines by providing a design, adapted for production of versatile and flexible configuration of gas turbines at the ultimate customer's worksite from mass produced standard components; so called modules, which are obtained from the original manufacturer of the modules.

We believe to have found a surprisingly simple, but—as thorough investigation has shown—a yet satisfactory solution to produce gas turbines of small or medium capacity in a way which allows application of series-wise manufacture of the integral constituents of the turbines and thereby not only to considerably reduce the initial cost thereof, but also to be in a position to supply from stock of a manufacturer of the component elements at the ultimate customer's worksite, a requested gas turbine within a short time from its having been ordered by a customer.

Accordingly, the present invention proposes to produce several modules, each of which can be produced in a few standard sizes, the modules are subsequently—when need arises—assembled at the ultimate customer's worksite from component elements supplied by a manufacturer, by connecting them by universal conduits and connections, to form a gas turbine unit answering to the requirements of an individual need or case.

The main modules which when modularily assembled constitute the gas turbine unit would be:
a) the combustion module,
b) the turbo module,
c) the supply module, and
d) the control module.

These four modules are selectively interconnected together by appropriate flexible connections, such as conduits of a removably mounted type, including air, gas and fuel conduits, as well as electrical leads and the necessary mechanical connecting and fastening means to form a gas generator which supplies compressed air or combustion products.

The combustion module is intended to be fed with fuel and air and has an air inlet port and air outlet port for combustion gases which is ready for attachment of flexible connections between modules, such as conduits, as may be required.

The turbo module is intended to transfer created energy to the flow of air or gas passing through the compressor.

The basic idea of this invention resides therein that the turbine is no longer built up as a compact, so to say self contained (one integral piece) unit, but is assembled from constituent parts which are separated and spaced from one another and which are interconnected—according to need—and interacting only by appropriate connecting conduits.

In this way the constituent parts of a gas turbine can be produced in a few standard dimensions and kept in storage to be assembled into a plurality of different geometrical relations by connection with one another whenever required and removal of connecting conduits, rearrangement of the modules and reattachment of the conduits to the same or different modules to form a preselected arrangement selected from arrangements including hot gas generator arrangements and air compressor arrangements. Needless to say, this assembling would take only a small fraction of time as compared with the conventional method of building the parts and assembling them at the same time at an original equipment factory where all the constituent parts are assembled as an integral unit.

The invention thus provides a complex of basic modules, which, by means of interconnection by removably mounted basic conduits, as will be described below, can be integrated into various gas-turbine and various flexible geometrical configuration machines or systems.

Every module is free standing, separate and self contained, meaning, that it can perform all its assigned functions without regard to its geometrical or physical position in relation to other parts of the machine so as to space individual components from each other, as long as it is properly connected by means of conduits to the other modules of the machine.

By the method of the invention a gas turbine arrangement at the ultimate customer's worksite as obtained from the manufacturer of the component elements is fabricated by:

(a) providing a first module for receiving compressed air, receiving fuel, mixing compressed air and fuel and igniting the mixture to thereby produce hot air and combustion products and exhaust same;

(b) providing a second module for receiving inlet air, transferring hot air and combustion products energy to inlet air received in said second module to compress said inlet air, and exhausting compressed air;

(c) providing a third module for supplying fuel to said first module and electrical power to said first module for ignition of said mixture;

(d) providing a fourth module for controlling starting of said arrangement, stopping of said arrangement, supply of fuel to said first module and supply of electrical power to said first module for ignition of said mixture;

(e) selectively interconnecting together by removably mounted conduit means each of said first, second, third and fourth modules for forming a gas generator which supplies compressed air or combustion products, said first, second, third and fourth modules being separated and spaced from one another and interacting only by said conduit means and arranged in a plurality of different geometrical relations by removal of said conduit means, rearrangement of said modules and reattachment of said conduit means to the same or different modules to form a preselected arrangement selected from arrangements including hot gas generator arrangements and air compressor arrangements.

A further step includes providing a fifth module for transferring hot air and combustion products energy to a mechanical connection.

A further step includes providing a sixth module for mixing hot air and combustion products with other material additionally supplied by said third module.

A further step includes providing a seventh module for transferring hot air and combustion products energy to inlet air to further heat said compressed air.

A further step includes providing an eighth module for causing variable heat transfer from said hot air and combustion products to a heated media.

A further step includes providing a ninth module for pumping inlet air into said arrangement during starting.

A fabricated gas turbine arrangement of the invention includes:

(a) a first module for receiving compressed air, receiving fuel, mixing compressed air and fuel and igniting the mixture to thereby produce hot air and combustion products and exhaust same;

(b) a second module for receiving inlet air, transferring hot air and combustion products energy to received inlet air to compress same, and exhausting said compressed air;

(c) a third module for supplying fuel to said first means and electrical power to said first means for ignition of said mixture;

(d) a fourth module for controlling starting of said arrangement, stopping of said arrangement, supply of fuel to said first module and supply of electrical power to said first module for ignition of said mixture;

(e) a fifth module for transferring hot air and combustion products energy to a mechanical connection;

(f) a sixth module for mixing hot air and combustion products with other material additionally supplied by said third module;

(g) a seventh module for transferring hot air and combustion products energy to inlet air to further compress said compressed air;

(h) an eighth module for causing variable heat transfer from said hot air and combustion products to a heated media;

(i) each of said first, second, third and fourth modules interconnected with one of said fifth, sixth, seventh and eighth modules in one of a plurality of different geometrical relations to form a preselected arrangement selected from arrangements including hot gas generator arrangements, air compressor arrangements and mechanical energy output arrangements.

A further embodiment includes a ninth module for pumping inlet air into said arrangement during starting.

DESCRIPTION OF THE PREFERRED EMBODIMENTS

The invention will now be described with reference to the accompanying schematical drawings which illustrate the different modules in purely schematical drawings, FIGS. 1-12 as will be explained in detail in the following.

Figure 1:
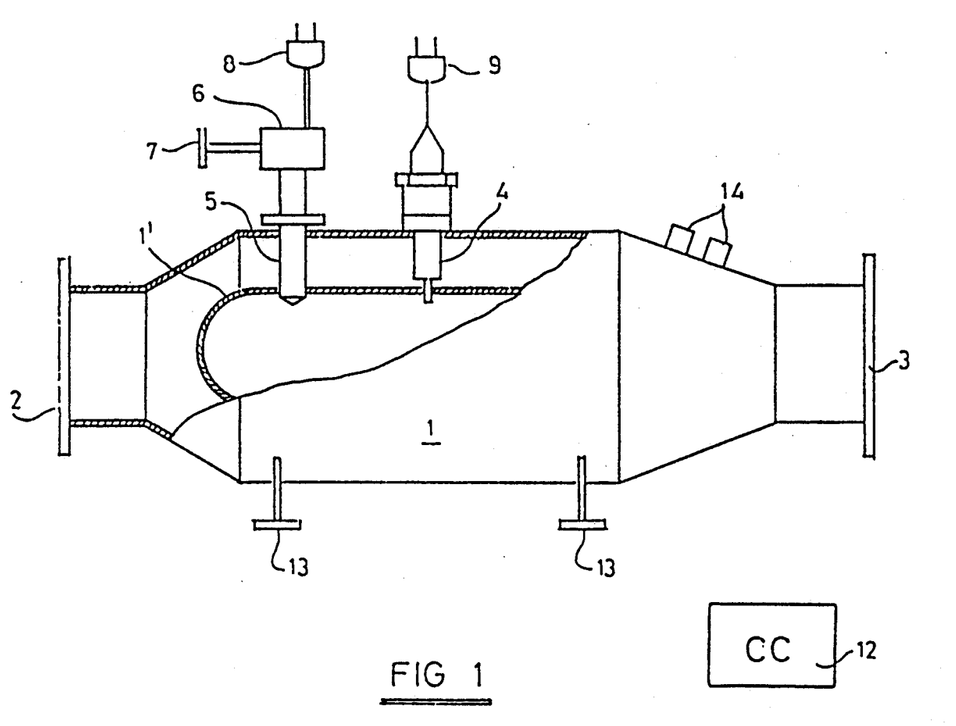
FIG. 1 is a schematic representation, partial sectional view of a combustion module.

Turning first to FIG. 1 showing the combustion module.

The function of combustion module is to receive air and fuel and produce combustion gases according to received signals.

The schematic symbol of the combustion module is (12).

The combustion module consists of combustion chamber (1) contained in pressure vessel (1') equipped with inlet air connection (2) and combustion gases outlet connection (3).

The combustion module is equipped with ignition device (4), fuel injecting or inserting means (5) and fuel control valves (6).

Fuel control valves (6) are equipped with appropriate fuel connections (7) and fuel signal connections (8).

The ignition device is equipped with ignition connection (9). The combustion module can be equipped with mounting attachments or legs (13) as options.

Pressure and temperature measuring connections (14) are optional.

It should be observed that the fact of introduction of modules and connecting means makes it possible to produce the parts in the way indicated and assemble them at time of need at the ultimate user's worksite and thus produce the gas turbine of the type and dimension dictated by local conditions and requirements of the purpose to which the turbine is to be put.

Figure 2:
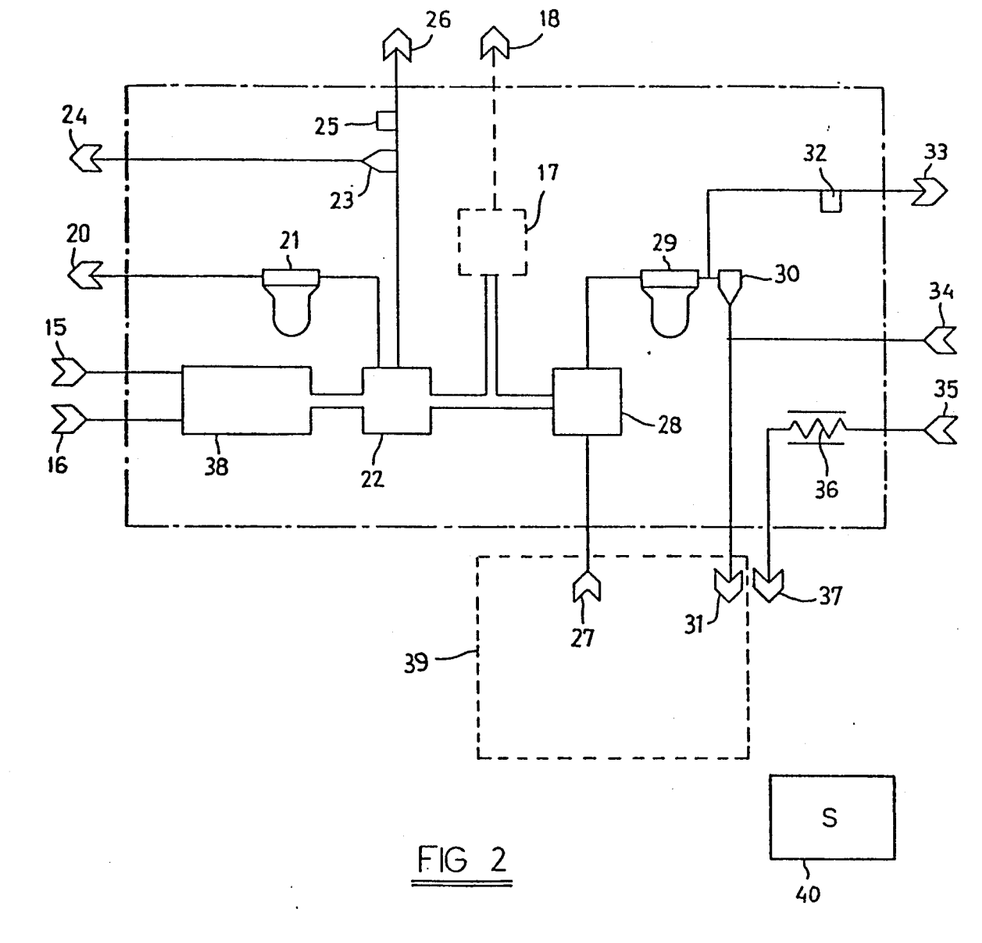
FIG. 2 is a schematic representation of a supply module.

Supply module—FIG. 2.

The function of the supply module is to receive oil, fuel and electricity from their sources by means of appropriate connectors and supply them to other modules under physical conditions necessary for operation.

The schematic symbol of the supply module is (40).

The supply module consists of the following systems mounted together: fuel supply, oil supply, ignition, module drive.

Auxiliary supply systems (17) and connections (18) are optional.

The fuel supply system consists of fuel inlet connection (20), fuel filter (21), fuel pump (22), fuel pressure regulator (23), fuel return connection (24), fuel pressure gauge or transducer (25), fuel pressure outlet connection (26).

The oil supply system consists of oil inlet connection (27), oil pump (28), oil filter (29), oil pressure regulator (30), oil return connection (31), oil pressure gauge or transducer (32), oil high pressure connection (33), and oil low pressure connection (34).

The ignition system consists of electrical power connection (35), ignition generator (36), and ignition connection (37).

The module drive (38) provides mechanical energy for pumps (22) and (28), and for ignition generator (35).

Optionally the supply module may also include an oil tank (39) but this is not mandatory.

The drive (38) is equipped with energy connection (15) and control connection (16).

Figure 3:
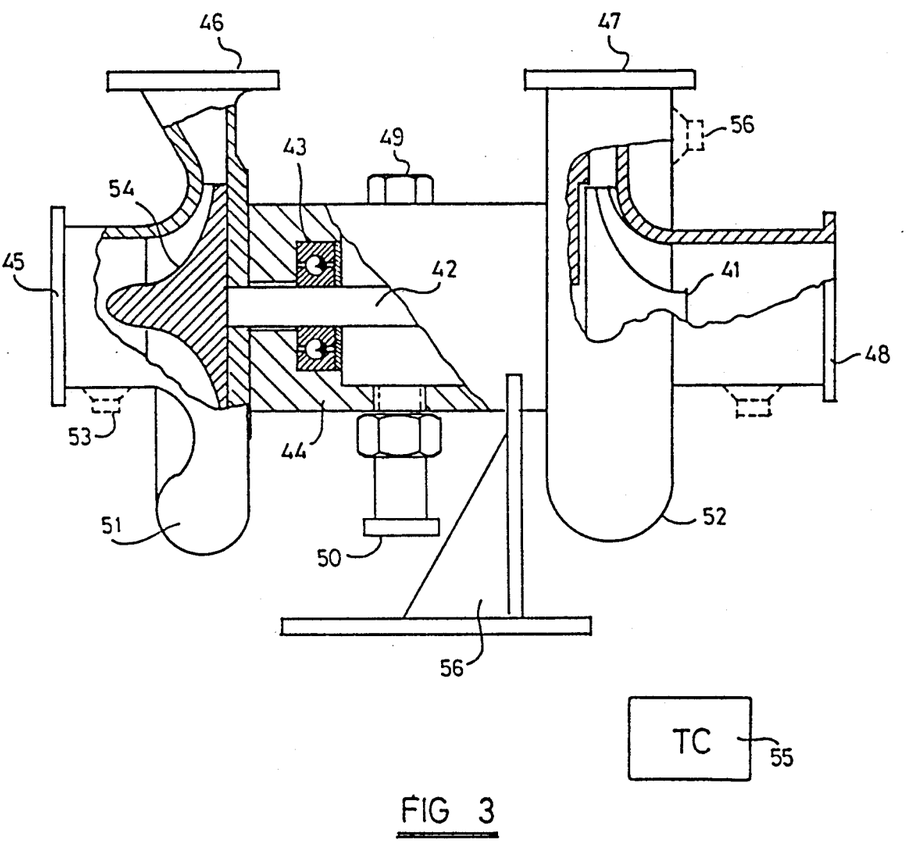
FIG. 3 is a schematic representation, partial sectional view of a turbo module.

Turbo module—FIG. 3.

The function of the turbo module is to transfer—according to the demands of the machine—part or all of turbine gas energy to air or gas flowing through the compressor.

The schematic symbol of turbo module is (55).

The turbo module consists of a compressor wheel (54) and gas turbine wheel (41) connected by a common shaft (42) running in bearings (43).

The housing (51) and gas turbine housing (52) are connected by bearing housing (44).

The turbo module is equipped with a compressor inlet connection (45), a compressor outlet connection (46), a turbine gases inlet connection (47), a turbine gases outlet connection (48), oil inlet connection (49), and an oil outlet connection (50).

Bearing housing (44) may be equipped with optional mounting pads (56).

Rotary velocity transducer connections (53) and turbine inlet and outlet transducer connections (56, 58) are optional.

Figure 4:
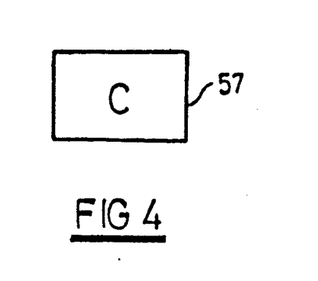
FIG. 4 is a schematic representation of a control module.

Control module—FIG. 4.

The control module consists of all control systems necessary for operating the machine and is equipped with appropriate signal (input) and command (output) connections. Additionally, the control module is equipped with control connections, manual (switches, potentiometers, valves) or remote (appropriate input-output interfaces), and necessary gauges and indicators.

In addition, the control module includes automatic safety override logic for overspeed, overtemperature, low oil pressures etc. Basic functions performed by the control module are: start-stop, fuel (power) control, oil system control, and ignition system control.

The schematic symbol of the control module is (57).

Figure 5:
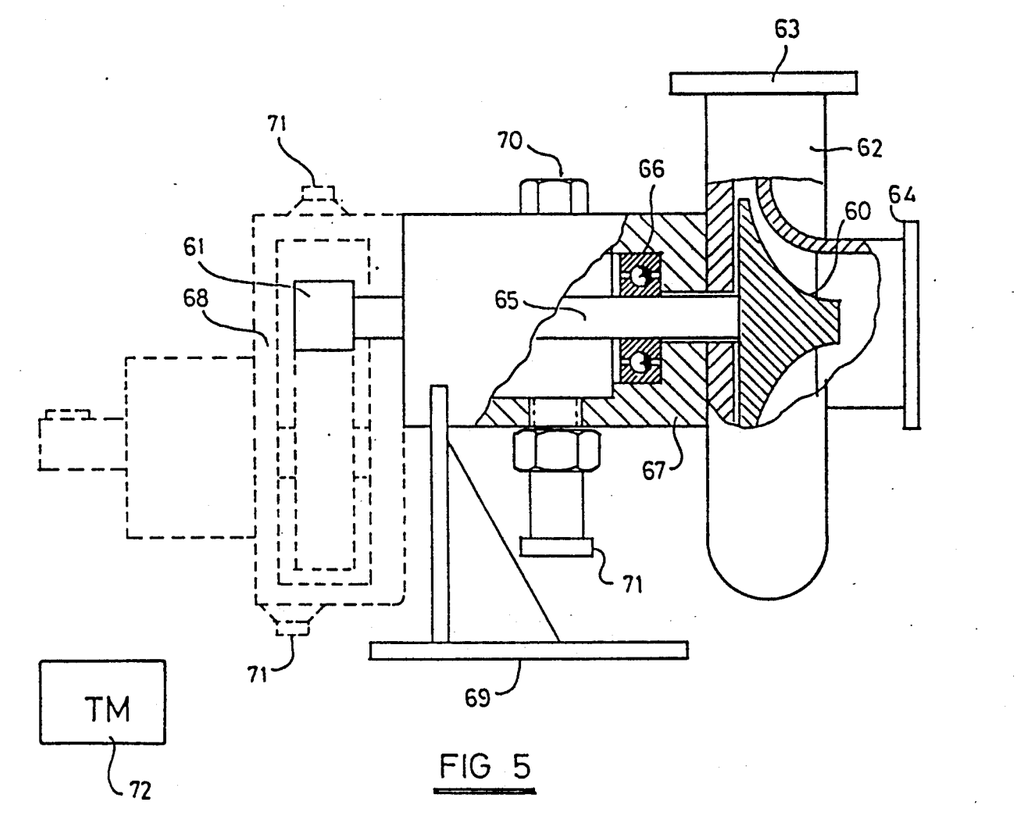
FIG. 5 is a schematic representation, partial sectional view of a turbo-mechanical module.

Turbo-mechanical module—FIG. 5.

The function of the turbo-mechanical module is to transfer, according to the demands of the machine, part or all of the energy of the gases flowing through the turbine, to the mechanical connection (61).

The schematic symbol of the turbo-mechanical module is (72).

The turbo-mechanical module consists of a gas turbine (60), equipped with a mechanical connection (61).

The gas turbine consists of a turbine wheel, turbine housing (62), turbine gases inlet connection (63), turbine gases outlet connection (64), turbine shaft (65), turbine bearings (66), and bearing housing (67).

Mechanical transmission (68) and mounting pads (69) are optional.

Bearing housing (67) and mechanical transmission (68) are equipped with oil inlet connections (70) and oil outlet connections (71).

Figure 6:
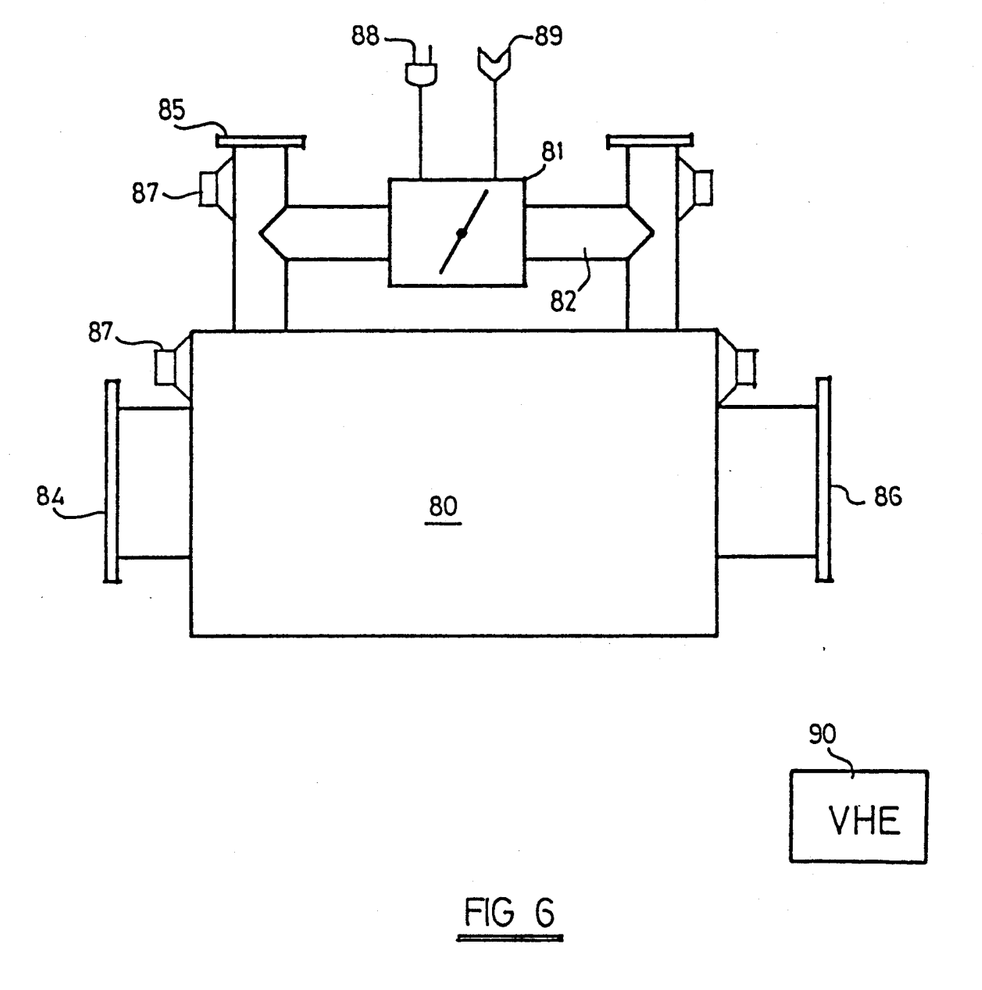
FIG. 6 is a schematic representation of a variable heat exchanger module.

Variable heat exchanger module—FIG. 6.

The function of the variable heat transfer module is variable heat transfer from heating media to heated media according to a command by the control module.

The schematic symbol of the variable heat-transfer module is (90).

The variable heat exchanger module consists of an appropriate heat exchanger equipped with a valve (81) controlling by-pass (82).

The module is equipped with appropriate inlet connections for heated media (83) and heating media (84), outlet connections for heated media (85) and heating media (86), appropriate temperature transducer connections (87), valve signal connections (88), and valve power connections (89).

Figure 7:
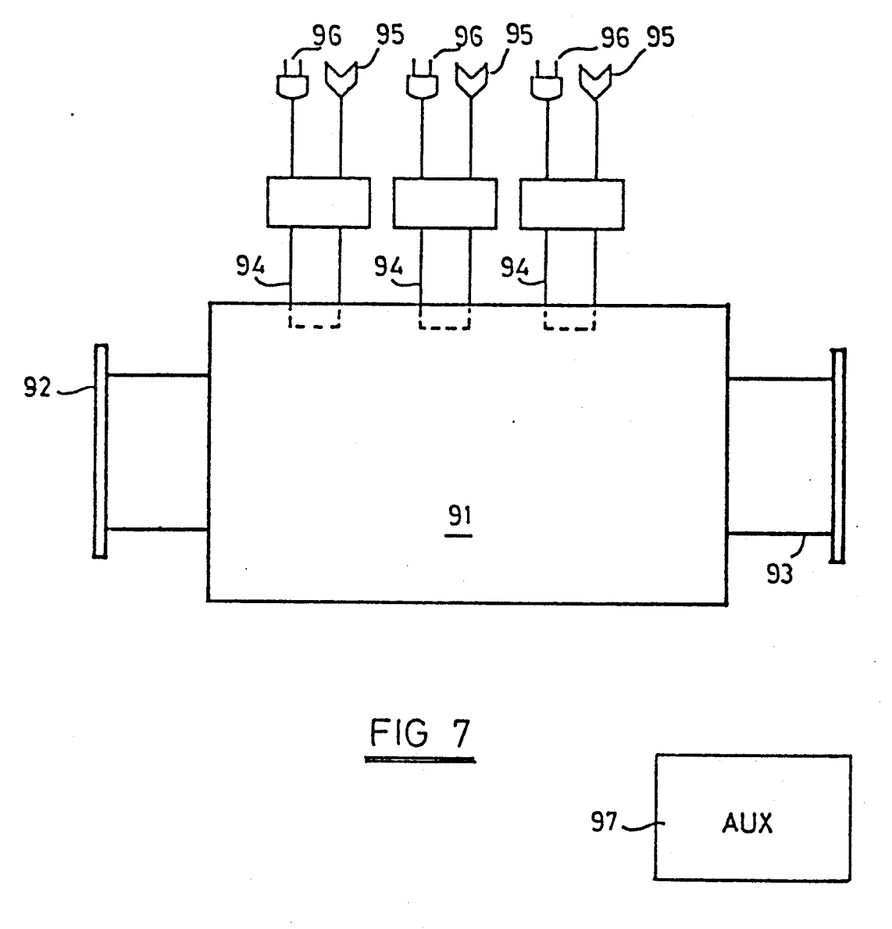
FIG. 7 is a schematic representation of an auxiliary mixing module.

Auxiliary mixing module—FIG. 7.

The function of the auxiliary mixing module is to add and mix gases flowing through the module with gases, liquids or solids, supplied by the supply module in amounts and conditions imposed by the command module.

The schematic symbol of the auxiliary mixing module is (97).

The auxiliary mixing module consists of mixing chamber (91), equipped with gas inlet connection (92), gas outlet connection (93), and means of injection (94).

The means of injection are equipped with a supply connection (95) and a control connection (96).

Figure 8:
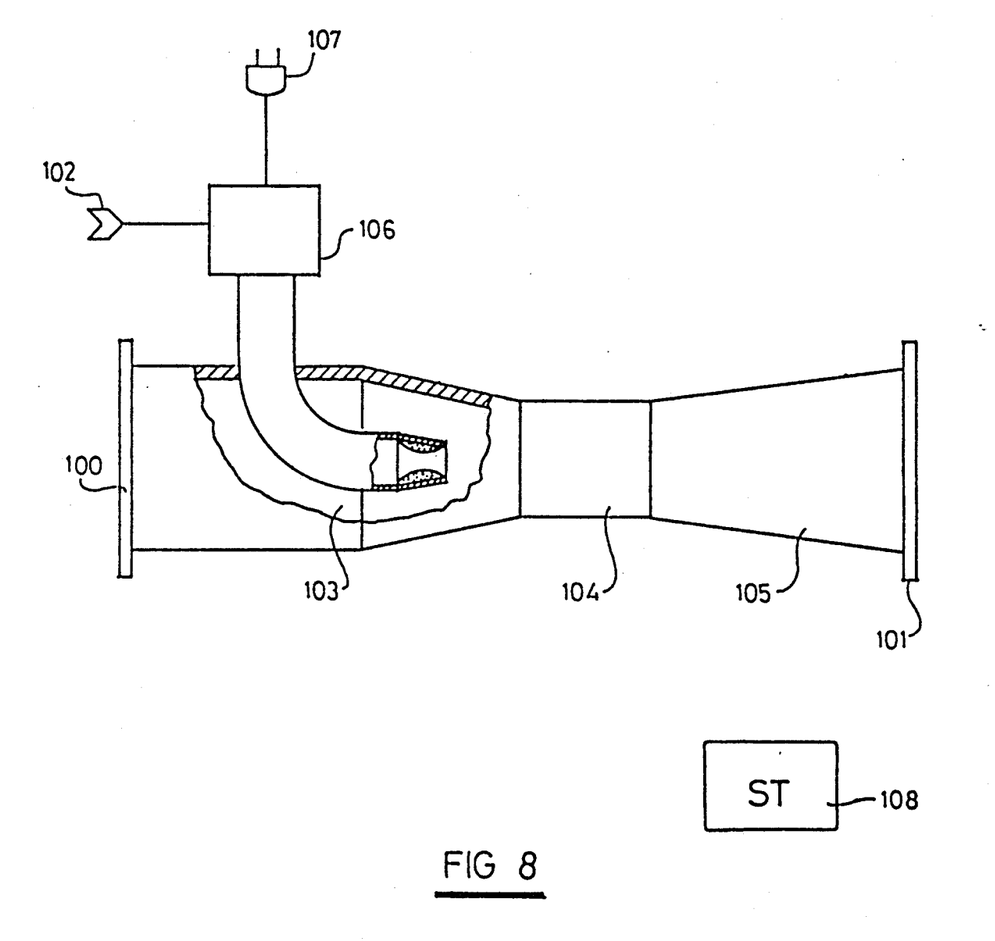
FIG. 8 is a schematic representation partial sectional view of a starting module.

Starting module—FIG. 8.

The function of the starting module is to pump air through the machine in a period of start-up to enable it to reach operating, self-sustaining parameters as ordered by control module IV.

The schematic symbol of start-up module is (108).

The starting module is a small gas-jet pump equipped with an air inlet connection (100), an air outlet connection (101), a gas inlet connection (102), a gas nozzle (103), a mixing chamber (104), a diffuser (105) and a gas valve (106) with a control convection (107).

Figure 9:
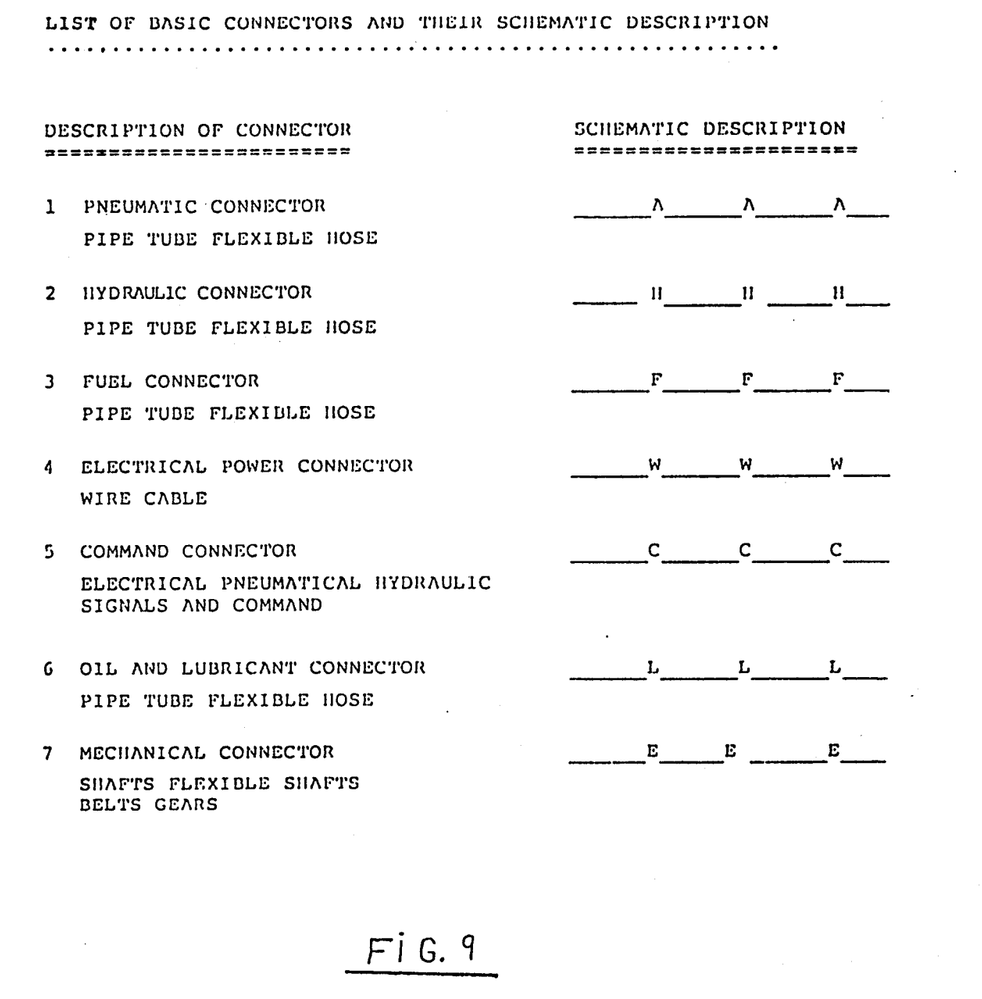
FIG. 9 is a schematic representation and description of basic connectors.

Basic conduits, their list and their schematic description are shown in FIG. 9.

A description of various embodiments of the invention will now be made.

As has already been stated, gas turbine machines and systems are created according to this invention, by connecting basic modules by basic conduits at the ultimate customer's worksite.

The size, length and form of the conduits are, according to this invention, not limited, as long as there is no appreciable change in physical parameters of the medium, transmitted by the conduit, between its input and output ends.

Basic modules and basic conduits are built in few sizes having different standard capacities. The modules of the same function and same or different sizes can be connected in parallel and/or in series by means of basic conduits and function as one bigger module of the same function. In this way, gas turbine machines and systems of practically any size and configuration can be built at the ultimate customer's worksite from a few sizes of basic modules and basic conduits. As previously explained, the geometrical relation and position between modules is not important to the functioning of the modules, as long as the separated and spaced modules are properly connected by the proper connections. The connections between the modules only need be of a length, of straight or curved configuration, and of a width as dictated by the conditions of use at the ultimate user's worksite. The relative position of the modules (that is to say, the parts which eventually form the turbine) are chosen by the ultimate customer, who knows the purpose to which the turbine will ultimately be used.

This unique property of the invention is of utmost importance, especially from an economical and production point of view; it becomes possible to produce a limited number of sizes of basic modules in great quantity, quickly and at minimum cost for the manufacturer. At the same time, the invention makes it possible to create from those parts a range of gas turbine machines in practically unlimited numbers of types and dimensions at the ultimate customer's worksite.

To illustrate the advantages of the invention a few possible embodiments of the invention are presented.

First embodiment—hot gas generator. This hot gas generator and conditioner is described in schematic diagram and descriptive form in FIG. 10.

Figure 10:
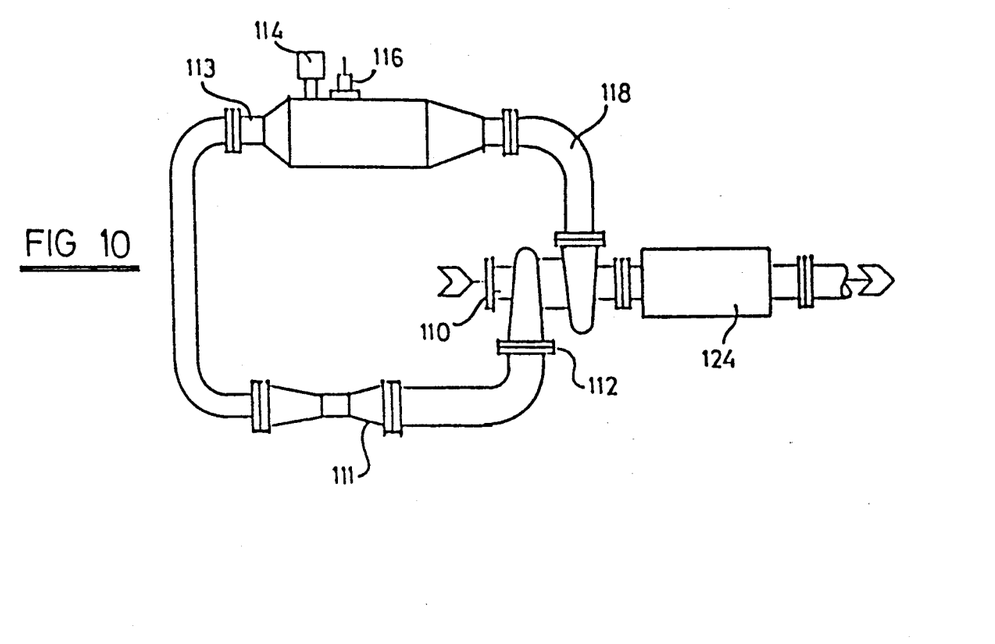
FIG. 10 is a schematic representation of a hot gas generator and conditioner.
Figure 10A:
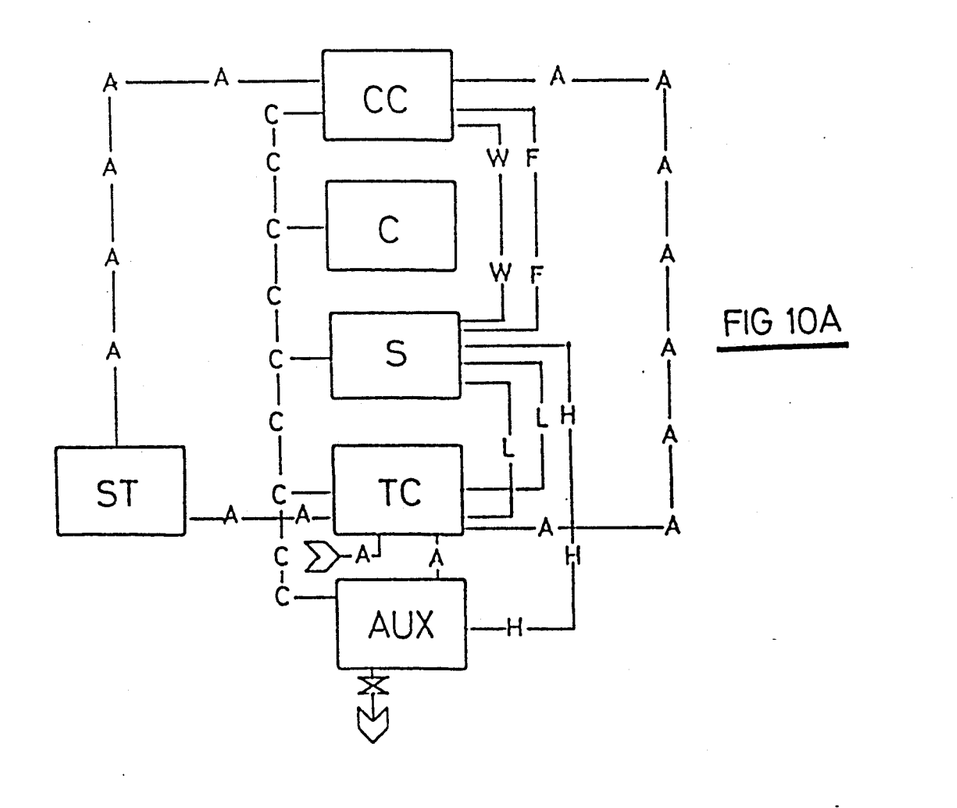
FIG. 10a is a schematic representation of a series of interconnected modules and removably mounted connecting conduits.

Schematic diagram 10a depicts modules (by symbols as described above) and their connection by basic conduits.

In descriptive form, supply and control modules are omitted as being installed in different location: a possibility unique to this invention.

In FIG. 10, ambient air enters an air inlet of a turbo module by means of module inlet 110 and leaves by module compressor outlet 112. Between compressor outlet 112 and combustion module inlet 113 the air passes starting module 111. Air is heated in the combustion module by combustion of fuel supplied by the injector controlled by valve 114 and ignitor device 116. Hot air and combustion products leave the combustion module by a combustion module outlet connection connected by conduit 118 to turbine inlet connection of the turbo module.

Hot air and combustion products drive the turbine wheel of the turbo module which in turn drives the compressor wheel of the turbo module. In this manner by connecting five basic modules, a working gas turbine machine—hot gas generator was produced. The hot air and combustion products flow from gas generator to auxiliary mixing module 124 and these are conditioned—according to command of the control module. In this way a generator of hot conditioned gases is produced.

Figure 11:
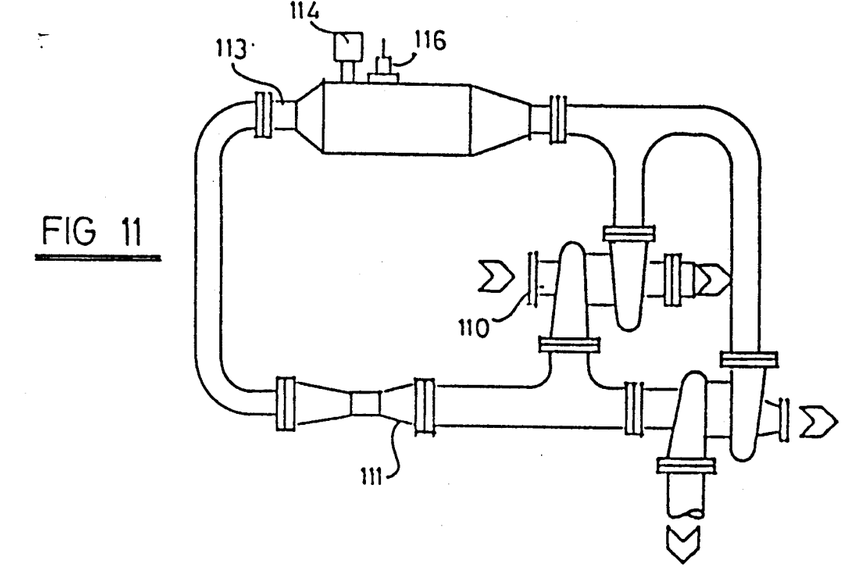
FIG. 11 is a schematic representation of a turbo-air compressor.
Figure 11A:
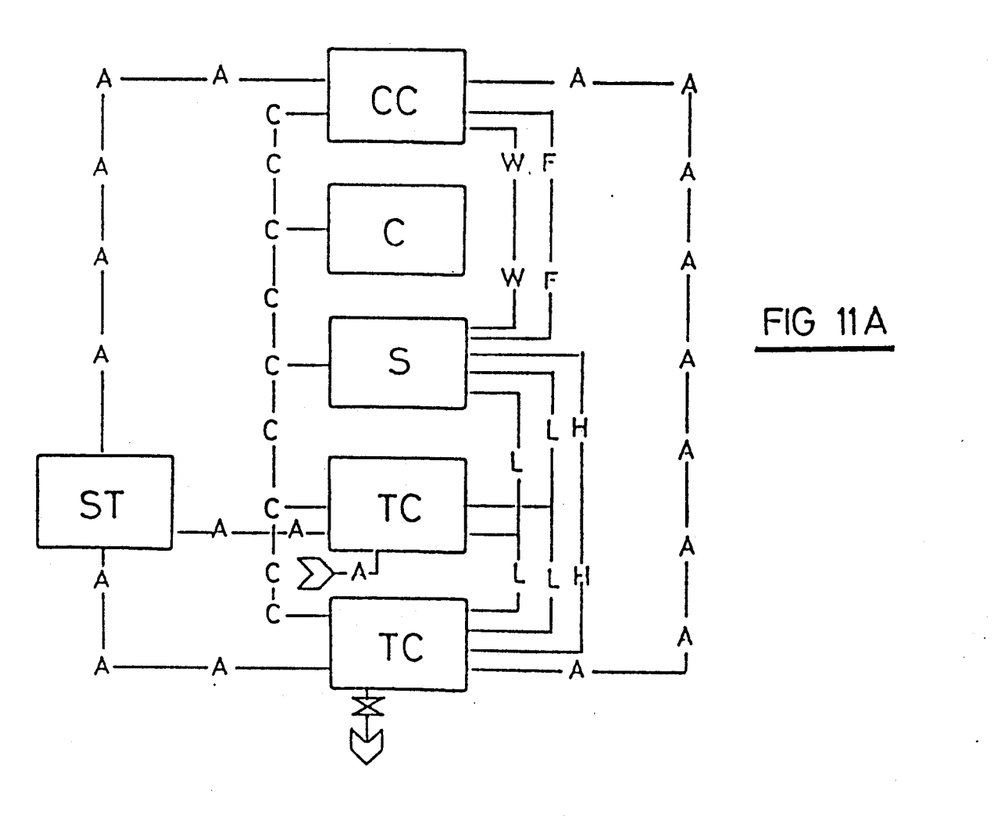

By replacing of the mixing module by the turbo module and its oil conduits and one pneumatic conduit by removal of certain conduits and reattachment of the conduits, this machine is transformed into a second embodiment of the invention—a turbo-air compressor.

A schematic diagram and descriptive form of this machine is depicted in FIG. 11.

The machine works exactly as described before, except that combustion gases are divided and connected to two turbomodules instead of one. One of the turbo-compressor modules works as before, the difference being that part of the compressed air is directed to an air inlet of a second turbo-compressor module by means of appropriate pneumatic conduits. The compressor of the second turbo-module, driven by its turbine, by the combustion gases of the combustion module—further compresses air from the first turbo-compressor.

In this manner, by the addition of one basic module and a few basic conduits, a different machine was created—a self-propelled turbo-air compressor.

Alternatively, by addition of a turbo-mechanical module to the system described in FIG. 10, yet another machine was created—a gas turbine engine giving mechanical energy output, this being a third possible embodiment of the invention.

Figure 12:
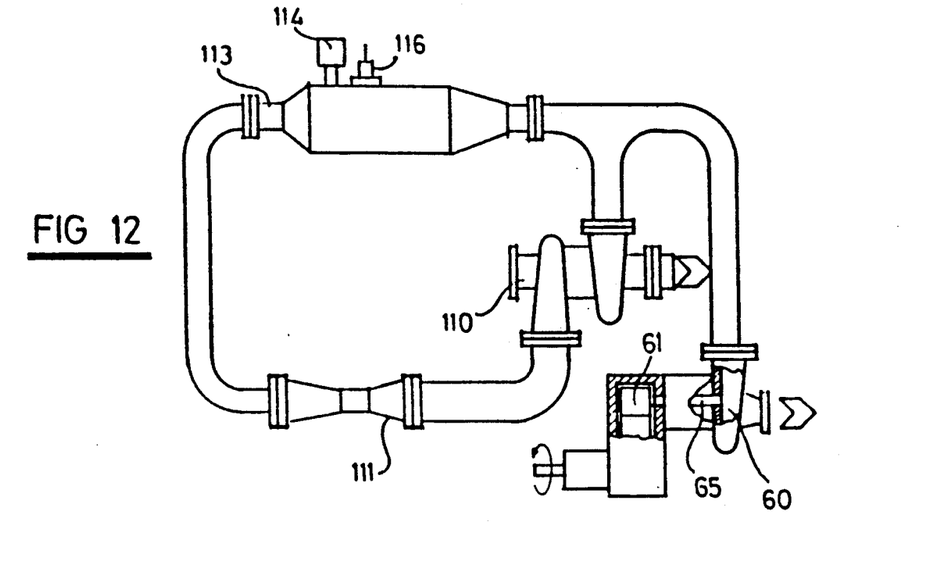
FIG. 12 is a schematic representation of a gas turbine energy with mechanical energy output.
Figure 12A:
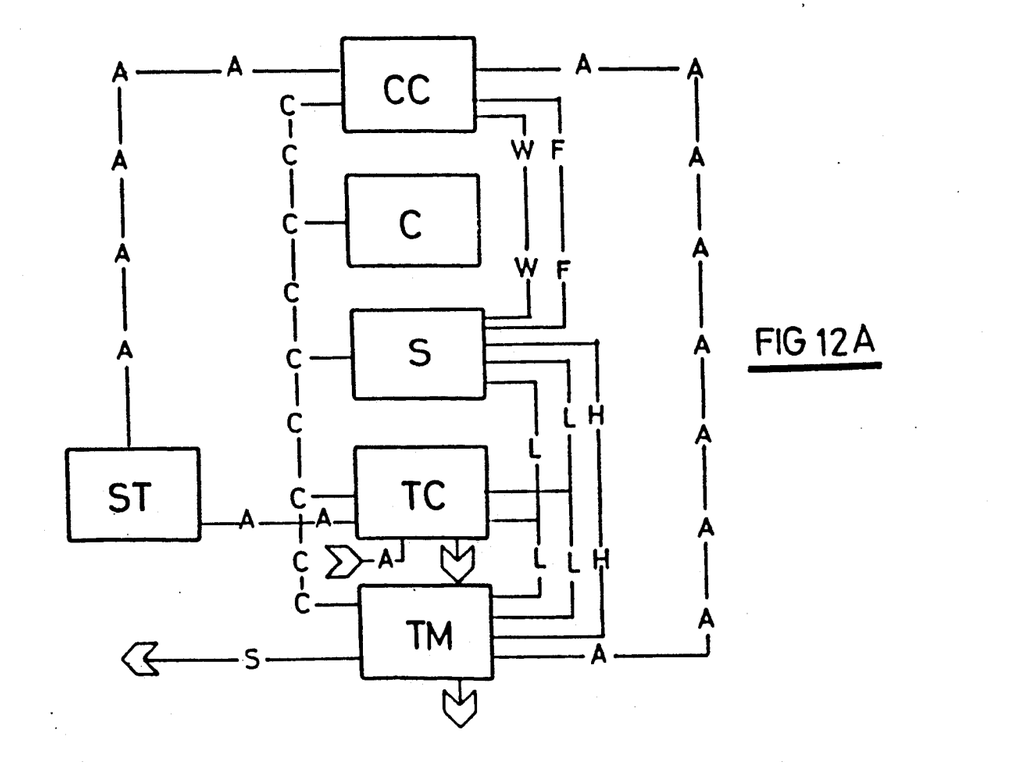

A schematic diagram and descriptive form of this machine are depicted in FIG. 12. In this embodiment, part of the combustion gases, produced as described in the first embodiment of the invention, is transferred through an appropriate connector to a gas turbine inlet of the turbo-mechanical module. The energy of those transferred gases is extracted from them by a turbo-mechanical module turbine wheel (60), converted to mechanical energy and by means of a turbine shaft (65) transmitted to a mechanical connection (61).

In FIG. 12, the mechanical connection (61) is connected further to a reducing gear and a mechanical energy converter as an example of another possible specific configuration produced by selectively interconnecting modules by removably mounted conduits and removal of the conduits for reattachment of the conduits to the same or different modules to form a preselected arrangement.

It should be observed that the fact of introduction of modules and connecting conduits makes it possible to produce the modules in the way indicated and assemble them at a time of need at an ultimate customer's worksite as obtained from the manufacturer of component elements and thus produce the gas turbine of the type and dimension dictated by local conditions and requirements of the purpose to which the turbine is to be put, i.e., to provide geometric flexibility of the assembly in a plurality of different geometrical relations.

We claim:

1. A method of fabricating a gas turbine arrangement at the ultimate customer's worksite as obtained from the manufacturer of the component elements, said method comprising the steps of (a) providing a first module for receiving compressed air, receiving fuel, mixing compressed air and fuel and igniting the mixture to thereby produce hot air and combustion products and exhaust same;

(b) providing a second module for receiving inlet air, transferring hot air and combustion products energy to inlet air received in said second module to compress said inlet air, and exhausting compressed air;

(c) providing a third module for supplying fuel to said first module and electrical power to said first module for ignition of said mixture;

(d) providing a fourth module for controlling starting of said arrangement, stopping of said arrangement, supply of fuel to said first module and supply of electrical power to said first module for ignition of said mixture;

(e) selectively interconnecting together by removably mounted conduit means each of said first, second, third and fourth modules for forming a gas generator which supplies compressed air or combustion products, said first, second, third and fourth modules being separated and spaced from one another and interacting only by said conduit means and arranged in a plurality of different geometrical relations by removal of said conduit means, rearrangement of said modules and reattachment of said conduit means to the same or different modules to form a preselected arrangement selected from arrangements including hot gas generator arrangements and air compressor arrangements.

2. A method of fabricating a gas turbine arrangement as claimed in claim 1, further comprising the step of providing a fifth module for transferring hot air and combustion products energy to a mechanical connection.

3. A method of fabricating a gas turbine arrangement as claimed in claim 2, further comprising the step of providing a sixth module for mixing hot air and combustion products with other material additionally supplied by said third module.

4. A method of fabricating a gas turbine arrangement as claimed in claim 3, further comprising the step of providing a seventh module for transferring hot air and combustion products energy to inlet air to further heat said compressed air.

5. A method of fabricating a gas turbine arrangement as claimed in claim 4, further comprising the step of providing an eighth module for causing variable heat transfer from said hot air and combustion products to a heated media.

6. A method of fabricating a gas turbine arrangement as claimed in claim 5, and further comprising the step of providing a ninth module for pumping inlet air into said arrangement during starting.

* * * * *